(12) United States Patent
Busayapongchai et al.

(10) Patent No.: US 7,577,568 B2
(45) Date of Patent: Aug. 18, 2009

(54) METHODS AND SYSTEM FOR CREATING VOICE FILES USING A VOICEXML APPLICATION

(75) Inventors: Senis Busayapongchai, Tucker, GA (US); Pichet Chintrakulchai, Tucker, GA (US)

(73) Assignee: AT&T Intellctual Property II, L.P., New York, NY (US)

( * ) Notice: Subject to any disclaimer, the term of this patent is extended or adjusted under 35 U.S.C. 154(b) by 843 days.

(21) Appl. No.: 10/458,532

(22) Filed: Jun. 10, 2003

(65) Prior Publication Data

US 2004/0254792 A1  Dec. 16, 2004

(51) Int. Cl.
G10L 13/08 (2006.01)
G10L 13/00 (2006.01)
G10L 11/00 (2006.01)
G06F 17/20 (2006.01)

(52) U.S. Cl. .............. 704/260; 704/258; 704/270; 715/205; 715/231; 715/234; 715/704

(58) Field of Classification Search ........... 704/258, 704/260, 270, 278; 715/513, 205–209, 231, 715/134, 246, 239, 255, 704, 216, 727
See application file for complete search history.

(56) References Cited

U.S. PATENT DOCUMENTS

| | | | | |
|---|---|---|---|---|
| 5,758,323 A | * | 5/1998 | Case | 704/278 |
| 5,771,276 A | * | 6/1998 | Wolf | 379/88.16 |
| 5,878,423 A | | 3/1999 | Anderson et al. | 707/100 |
| 6,014,428 A | * | 1/2000 | Wolf | 379/88.11 |
| 6,035,272 A | * | 3/2000 | Nishimura et al. | 704/258 |
| 6,101,470 A | * | 8/2000 | Eide et al. | 704/260 |
| 6,366,883 B1 | * | 4/2002 | Campbell et al. | 704/260 |
| 6,629,087 B1 | * | 9/2003 | Benson et al. | 706/11 |
| 6,697,796 B2 | * | 2/2004 | Kermani | 707/3 |
| 6,728,682 B2 | * | 4/2004 | Fasciano | 704/278 |
| 6,862,568 B2 | * | 3/2005 | Case | 704/260 |
| 6,891,932 B2 | * | 5/2005 | Bhargava et al. | 379/88.02 |
| 6,895,084 B1 | * | 5/2005 | Saylor et al. | 379/88.22 |
| 6,950,798 B1 | * | 9/2005 | Beutnagel et al. | 704/260 |
| 6,990,450 B2 | * | 1/2006 | Case et al. | 704/260 |
| 7,003,719 B1 | * | 2/2006 | Rosenoff et al. | 715/500.1 |
| 7,039,585 B2 | * | 5/2006 | Wilmot et al. | 704/235 |
| 7,039,588 B2 | * | 5/2006 | Okutani et al. | 704/258 |
| 7,055,146 B1 | * | 5/2006 | Durr et al. | 717/162 |

(Continued)

*Primary Examiner*—Patrick N Edouard
*Assistant Examiner*—Douglas C Godbold (57) ABSTRACT

Methods and systems for automating the assembly or creation of audio files for providing to listeners or for use in voice interactive services are provided. A voice application script is prepared and text associated with a desired audio file statement is inserted in the voice application in place of an audio file name. A recording manager software program passes the voice application script to an Extensible Markup Language (XML) parser that locates audio file tags in the voice application script. The XML parser extracts voice properties, if any, for each found audio tag, such as age and gender properties. The XML parser extracts the text string, and the recording manager software module passes the text string and associated properties in a database query to an audio file recording library database for locating an audio file matching the text string and properties. If a matching audio file or combination of audio files is located, a file name for the located file or files may be populated into the voice application script so that upon execution of the voice application script, the located audio file will be called by the script for presentation to a user or for use in a voice interactive services system.

27 Claims, 5 Drawing Sheets

U.S. PATENT DOCUMENTS

| | | | |
|---|---|---|---|
| 7,107,536 B1 * | 9/2006 | Dowling | 715/738 |
| 7,140,004 B1 * | 11/2006 | Kunins et al. | 717/125 |
| 2002/0072900 A1 * | 6/2002 | Keough et al. | 704/220 |
| 2003/0014407 A1 * | 1/2003 | Blatter et al. | 707/6 |
| 2003/0187656 A1 * | 10/2003 | Goose et al. | 704/270.1 |
| 2003/0216923 A1 * | 11/2003 | Gilmore et al. | 704/270.1 |
| 2004/0199494 A1 * | 10/2004 | Bhatt | 707/3 |

* cited by examiner

METHODS AND SYSTEM FOR CREATING VOICE FILES USING A VOICEXML APPLICATION

FIELD OF THE INVENTION

This invention relates generally to methods and systems for creating voice files using a VoiceXML application. More particularly, the present invention relates to methods and systems for automating the assembly or creation of audio files from pre-recorded audio files, audio streams and/or synthesized speech files for presentation to listeners or for use in voice interactive services.

BACKGROUND OF THE INVENTION

With the advent of modern telecommunications systems, users call a variety of goods and services providers for a number of goods and/or services related issues. Users call their wire line and wireless telecommunication services providers for services such as directory assistance, voice mail services, services maintenance, and the like. Likewise, customers call a variety of vendors for goods and services such as financial services, general information services, and the like. Because of the enormous volume of such calls, may services providers and goods vendors make use of voice interactive services systems for reducing the number of live personnel required to process incoming calls. For example, a caller may call her telecommunications services provider for directory assistance. Rather than connecting the caller to a live operator, the caller may be connected to a voice interactive directory assistance system that may answer "welcome to the directory assistance service-please say the name of the party you wish to reach." Likewise, a caller may call a goods provider, such as a department store, and the caller may receive an automated voice interactive answering service such as "if you know the number of the store department you would like to reach, please enter the number now." Such voice interactive services may be provided by on-the-premises equipment, or a goods/services provider may utilize the voice interactive services of a third party, such as a telecommunications services provider.

In order to provide such voice interactive services, audio files must be prepared for providing initial contact with the caller and for providing responses to requests by the caller. For example, following from the example described above, an audio file such as "welcome to the directory assistance service" must be prepared by the telecommunications services provider for playing to a caller when the caller calls the telecommunications services provider for directory assistance. Users of the recorded audio file, such as telecommunications services providers or other goods/services providers, may maintain a number of pre-recorded audio files for providing to listeners, as described above. That is, a pre-recorded audio file such as "welcome to the directory assistance service" may be established by a telecommunications services provider and may be saved for subsequent use.

Developers of audio files for use in voice interactive services systems, typically create a number of pre-recorded files that may be utilized individually or that may be combined with other pre-recorded audio files to create a desired audio file. For example, because a telecommunications services provider knows that it will need the audio file "welcome to the directory assistance service" a pre-recorded audio file for that statement may be prepared using a number of different age and gender voice talents, such as male youth, male adult, female youth, female adult, etc. Additionally, a number of statement segments may be pre-recorded that may subsequently be combined to create a desired audio file. For example, a pre-recorded phrase such as "welcome to" may be recorded, a pre-recorded audio such as "directory assistance" may be recorded, a pre-recorded file such as "please say the name" may recorded, and a pre-recorded file such as "of the party you wish to reach" may be recorded. Subsequently, if a developer of audio files for use in a voice interactive service, as described above, desires to create an audio file for the statement "welcome to the directory assistance service-please say the name of the party you wish to reach," the developer may be required to combine the pre-recorded audio statement segments to create the desired statement.

According to prior art systems, developers of audio files for use in voice interactive services must determine the file location and file name of audio files or audio file statement segments required by the developer. Typically, the developer must manually search a database of audio files or audio file statement segments to locate desired audio files. Unfortunately, because the developer may require a specific voice talent, such as female adult, the developer must select audio files, listen to the audio files, and then determine whether a selected audio file is appropriate, or determine whether a selected audio file statement fragment may be used in association with other audio file statement segments to create a desired audio file. That is, the developer may have to select and listen to a number of statement segments such as "welcome to" and a number of statement segments such as "the directory assistance services" to find audio file statement segments that may be used to create a desired audio file. Because there are many ways to break a desired audio file statement into segments, the task of finding the appropriate way to break the desired phrase and finding suitable recorded audio files for each segment is very tedious, time consuming and error prone. Furthermore, if there are no files that satisfy a particular audio file statement, or if there are insufficient audio file segments to combine to create a desired audio file statement, the developer must create a new audio file or audio file segment.

It is with respect to these and other considerations that the present invention has been made.

SUMMARY OF THE INVENTION

Embodiments of the present invention provide methods and systems for automating the assembly or creation of audio files for providing to listeners or for use in voice interactive services. According to one aspect of the present invention, an audio file developer prepares a voice application script and inserts text associated with a desired audio file statement in the voice application in a location in the script where the developer would ordinarily insert an audio file name of a pre-recorded audio file of the desired audio file statement. A recording manager software program passes the voice application script to an Extensible Markup Language (XML) parser that locates audio file tags in the voice application script associated with audio files or audio file text. The XML parser extracts voice properties for each found audio tag, such as age and gender properties associated with each found audio tag. If no voice properties are found, default properties, such as female adult, are set for the audio file or audio file text associated with the audio file tag.

Next, the XML parser extracts the text string entered by the developer, and the recording manager software module passes the text string and associated properties in a database query to an audio file recording library database for locating an audio file matching the text string and properties. For example, if the text string comprises "welcome to the directory assistance services," the text string is passed by the recording manager software module along with the desired properties, such as female adult, in a database query to an audio file recording library to locate an audio file matching the desired text string and properties. If an exact matching audio file with matching voice properties is located, the file may be automatically accepted, or the file may be passed to the developer for review. If the audio file is accepted by the developer, or if the audio file is automatically accepted, the file name for the audio file is populated into the voice application script being prepared by the developer so that upon execution of the voice application script, the located audio file will be called by the script for presentation to a user or for use in a voice interactive services system.

If an exact match for the audio file text and voice properties is not found, a determination as to whether partial matches for the desired audio file text are found. That is, a determination is made as to whether audio file segments are located that may be combined to provide the desired audio file statement. According to one aspect of the invention, a first attempt is made to locate audio file segments having the required properties for the desired audio file. If audio file segments are located that may be combined to create the desired audio file having the required properties, a combination of the audio file segments is created and is passed to the developer for review. If audio file segments containing the proper statement segments are found, but not containing the required voice properties, a second combination of audio file segments may be combined and passed to the developer for review. And, if audio file segments are found that may be combined to only partially create the desired file statement, a third combination of the located audio file segments may be prepared and passed to the developer for review. Once the developer receives and reviews the combined audio file segments, the developer may accept one or more of the audio file segment combinations, and an audio file name associated with the selected combination is populated into the voice application script for subsequent execution for presenting the desired audio file to a listener or for use in a voice interactive services system. If no acceptable audio file is provided to the developer, or if only a partially acceptable audio file is provided to the developer, a manual process may be followed for obtaining a voice talent having the required voice properties for creating a new voice audio file, or for creating a required voice audio file segment for combining with previously located voice audio file segments for creating an acceptable combination of voice audio file segments.

These and other features and advantages, which characterize the present invention, will be apparent from a reading of the following detailed description and a review of the associated drawings. It is to be understood that the foregoing general description and the following detailed description are exemplary and explanatory only and are not restrictive of the invention as claimed.

DETAILED DESCRIPTION OF THE INVENTION

The following description of embodiments of the present invention is made with reference to the above-described drawings wherein like numerals refer to like parts or components throughout the several figures. The present invention is directed to methods and system for automating the creation or assembly of voice audio files for presentation to listeners or for use in voice interactive services.

According to embodiments of the present invention, voice application audio files are constructed for presentation to listeners or for use in a voice interactive services system, as briefly described above. As is known to those skilled in the art, voice software applications allow spoken dialogues between users and voice systems. Such a system allows users to converse with the voice system where a user is provided with a voice prompt such as "for service in English, press 1" followed by a response from the user whereby the user may speak a response to the system or select a response mechanically such as by selecting a numeral on a telephone keypad. In a typical voice interactive system, a computer and associated peripheral and networked devices communicate with a caller via computer telephony interfaces. When a voice request or manual request (selection of a keypad numeral), is received from a caller via a computer telephony interface, a receiving computer locates a responsive voice audio file for presentation to the caller. A software application executed by the computer may obtain the required voice audio file and may play the voice audio file to the caller, and the computer may then play or caused to be played the selected voice audio file to the caller. Based on the responses to the played voice audio file received from the caller, the computer may locate and execute additional voice audio files, or the computer may provide or cause to be provided a service, such as directory assistance services, responsive to the request received from the caller via the voice interactive session.

Voice Extensible Markup Language (VoiceXML) is a standard scripting language widely used for developing voice applications for executing voice audio files according to embodiments of the present invention. Voice application developers may use a variety of text editors, or graphical user interface editors to write VoiceXML applications. According to an embodiment of the present invention, a suitable VoiceXML application editor is V-Builder provided by Nuance Company.

Figure 1:
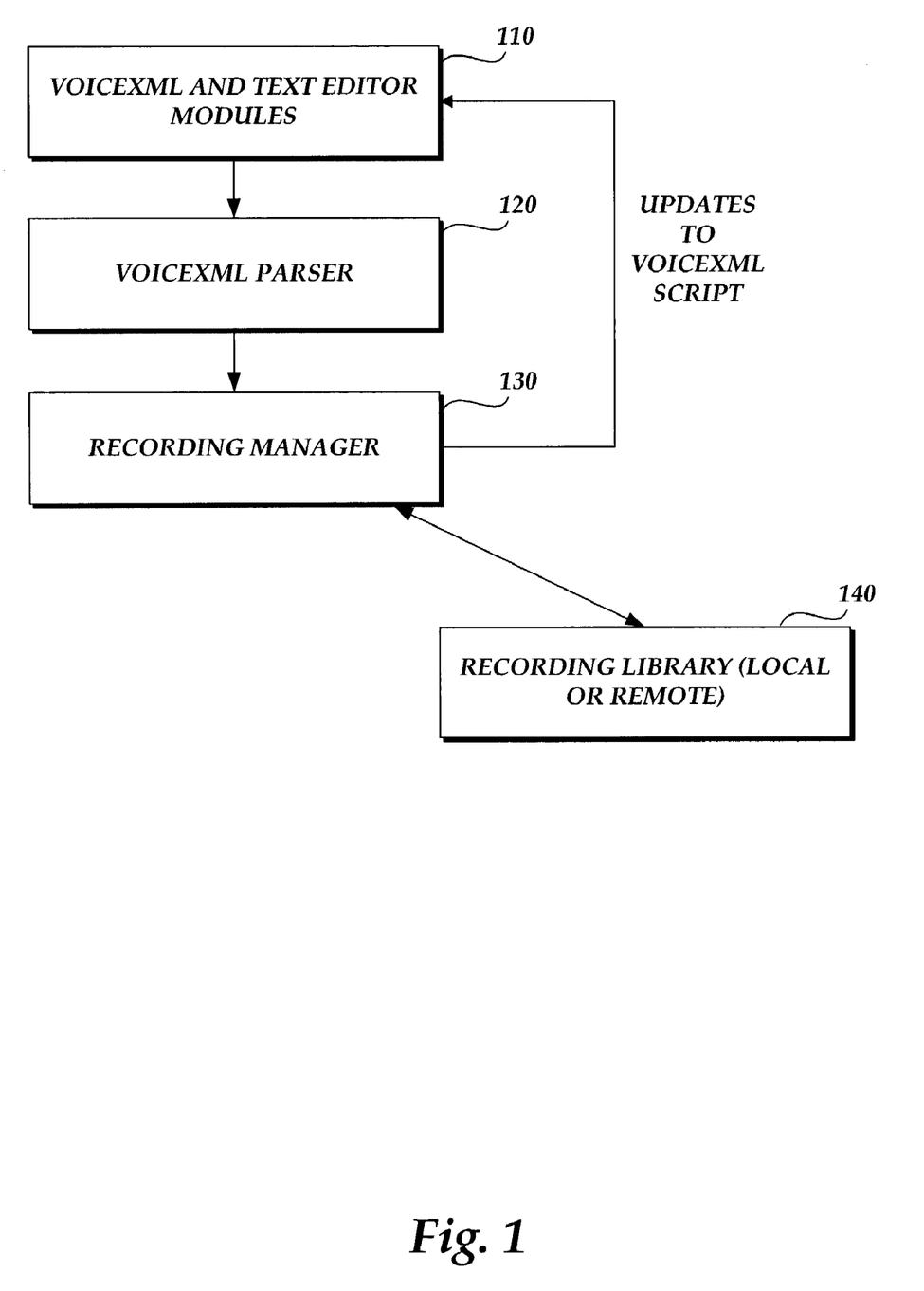
FIG. 1 is a simplified block diagram illustrating components of exemplary architecture for embodiments of the present invention.

FIG. 1 is a simplified block diagram illustrating components of an exemplary architecture for embodiments of the present invention. According to an embodiment of the present invention, a recording manager 130 is a software application program module designed to assist the developer in automatically managing previously recorded audio files or audio file segments for developing desired VoiceXML applications. The functionality of the recording manager 130 is provided in combination with a VoiceXML text editor module 110, a VoiceXML parser 120 and local or remote recording library 140. As should be understood, the recording library 140 may be a local or remotely stored database containing audio files for use in accordance with embodiments of the present invention.

According to an embodiment of the present invention, the recording manager module 130 works as a post-processor application and is applied to a VoiceXML application after the developer has edited the VoiceXML code for the application. As is known to those skilled in the art, VoiceXML is a scripting language based on the Extensible Markup Language (XML). In VoiceXML, an audio file name is an attribute specified in an "audio" tag. Typically, the audio file name is specified via a uniform resource indicator "URI" in a source attribute, but it may also be specified as a variable specified in an expression attribute. For example, a typical VoiceXML script may be as follows:

```
<audio src="hello.wav>hello</audio>
<assign name="myclip" expr="hello.wav"/>
<audio expr="myclip"/>
```

For example, "hello.wav" may be an audio file which when executed by a computer executing the VoiceXML script plays to a listener the phrase "hello." In addition, voice attributes may be specified such as male adult, male youth, female adult, female youth, etc. For example the following VoiceXML script specifies a voice gender of "male" a category of "adult" and voice talent named "Tom".

```
<voice gender="male" category="adult" name="tom"/>
```

Attributes of male and adult may be utilized to define the voice audio file as male and adult, and the voice talent of "Tom" may be utilized to locate a voice audio file recorded by a live voice talent named "Tom."

According to an embodiment of the present invention, the application developer using the VoiceXML text editor module 110 prepares a VoiceXML script, as set out above. The VoiceXML parser 120 parses the VoiceXML script and searches for "audio" tags and "source" attributes, and extracts the text content, for example "hello" specified for the located audio tag. For each located audio tag, the recording manager 130 passes the associated text and audio file properties or attributes, for example male youth, to the recording library 140 via a database query to search for an existing audio file reference matching the desired audio file. If an existing audio file is found in the recording library 140, the recording manager 130 retrieves the audio file or a combination of audio files that may be combined to create the desired audio file. The located single audio file or combination of audio files are presented to the developer who has the option of allowing the recording manager 130 to automatically populate the VoiceXML script with the audio file name associated with the located audio file or combination of audio files, or the developer may manually verify the recordings by playing the audio files for review. If no matching audio file or combination of audio file segments is found, new recording references may be created. According to an alternative embodiment, the recording manager 130 may interface with a VoiceXML graphical user interface editor in which case the recording manager 130 concentrates on parsing the VoiceXML code generated by the VoiceXML graphical user interface editor without having to search through the entire VoiceXML code for individual audio tags.

Figure 2:
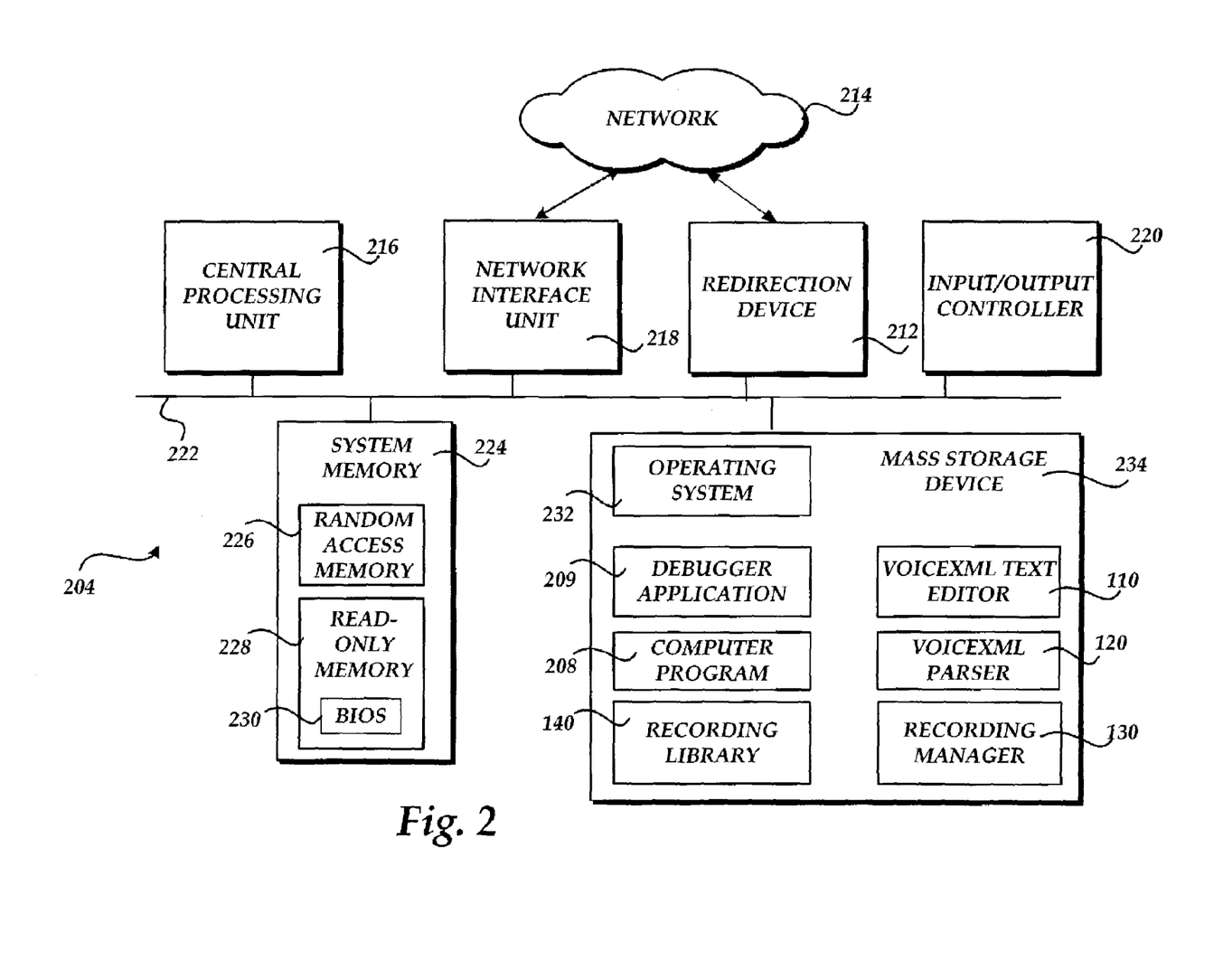
FIG. 2 is a simplified block diagram of a computer and associate peripheral and networked devices that provide and exemplary operating environment for the present invention.

According to embodiments of the present invention, the VoiceXML text editor module 110, the VoiceXML parser 120, the recording manager of 130 and the recording library 140 may be resident on the developer's computer 204, described below. Alternatively, the modules 110, 120, and 130 may be accessed by the developer from a local or remote server accessible to the developer from the computer 204. Likewise, the recording library 140 may be a database of recorded audio files resident at the developer's computer 204 or resident at a local or remote server accessible by the developer via a distributed computing environment such as the Internet.

FIG. 2 illustrates the architecture of a suitable computing device and associated peripheral devices for use in implementing the methods and systems of the present invention. While the invention is described in the general context of program modules that execute in conjunction with an application program that runs on an operating system on a personal computer, those skilled in the art will recognize that the invention may also be implemented in combination with other program modules. Generally, program modules include routines, programs, components, data structures and other types of structures that perform particular tasks or implement particular abstract data types. Moreover, those skilled in the art will appreciate that the invention may be practiced with other computer system configurations, including hand-held devices, multiprocessor systems, multiprocessor-based or programmable consumer electronics, mini computers, mainframe computers, and the like. The invention may also be practiced in distributed computing environments where tasks are performed by remote processing devices that are linked through a communications network. In a distributed computing environment, program modules may be located in both local and remote memory source devices.

The computer architecture shown in FIG. 2 illustrates a conventional server or personal computer 204, including a central processing unit 216 ("CPU"), a system memory 224, including a random access memory 226 ("RAM") and a read-only memory ("ROM") 228, and a system bus 222 that couples the memory to the CPU 216. A basic input/output system 220 containing the basic routines that help to transfer information between elements within the computer, such as during startup, is stored in the ROM 228. The computer 2044 further includes a mass storage device 234 for storing an operating system 232 suitable for controlling the operation of a networked computer, such as the WINDOWS NT or XP operating systems from MICROSOFT CORPORATION of Redmond, Washington. The mass storage device 234 may also store application programs, such as the computer program 208, the VoiceXML text editor 110, the VoiceXML parser 120 and the recording manager 130. The mass storage device may also include data such as the recording library 140.

The mass storage device 234 is connected to the CPU 216 through a mass storage controller (not shown) connected to the bus 222. The mass storage device 234 and its associated computer-readable media, provide non-volatile storage for the computer 204. Although the description of computer-readable media contained herein refers to a mass storage device, such as a hard disk or CD-ROM drive, it should be appreciated by those skilled in the art that computer-readable media can be any available media that can be accessed by the computer 204.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 204 may operate in a networked environment using logical connections to remote computers through a network 214, such as the Internet or a LAN. The computer 204 may connect to the network 214 through a network interface unit 218 connected to the bus 222. It should be appreciated that the network interface unit 218 may also be utilized to connect to other types of networks and remote computer systems. The computer 204 may also include an input/output controller 220 for receiving and processing input from a number of devices, including a keyboard, mouse, or electronic stylus (not shown in FIG. 2). Similarly, an input/output controller 220 may provide output to a display screen, a printer, or others type of output devices.

Having described an illustrative system architecture for embodiments of the present invention with reference to FIG. 1, and having described illustrative operating environments for embodiments of the present inventions with reference to FIG. 2, FIGS. 3, 4, and 5 are flow diagrams illustrating a method for automating the assembly or creations of voice audio files for presentation to listeners or for use in voice interactive services. The method 300 begins at start step 302 and proceeds to step 304 where a VoiceXML script developer creates a VoiceXML script having desired audio tags, such as the illustrative VoiceXML script described above with reference to FIG. 1. For example, the developer may wish to create a VoiceXML script for playing an announcement to a caller such as "welcome to your telecommunications services provider for services in English press 1 or say English."

Figure 3:
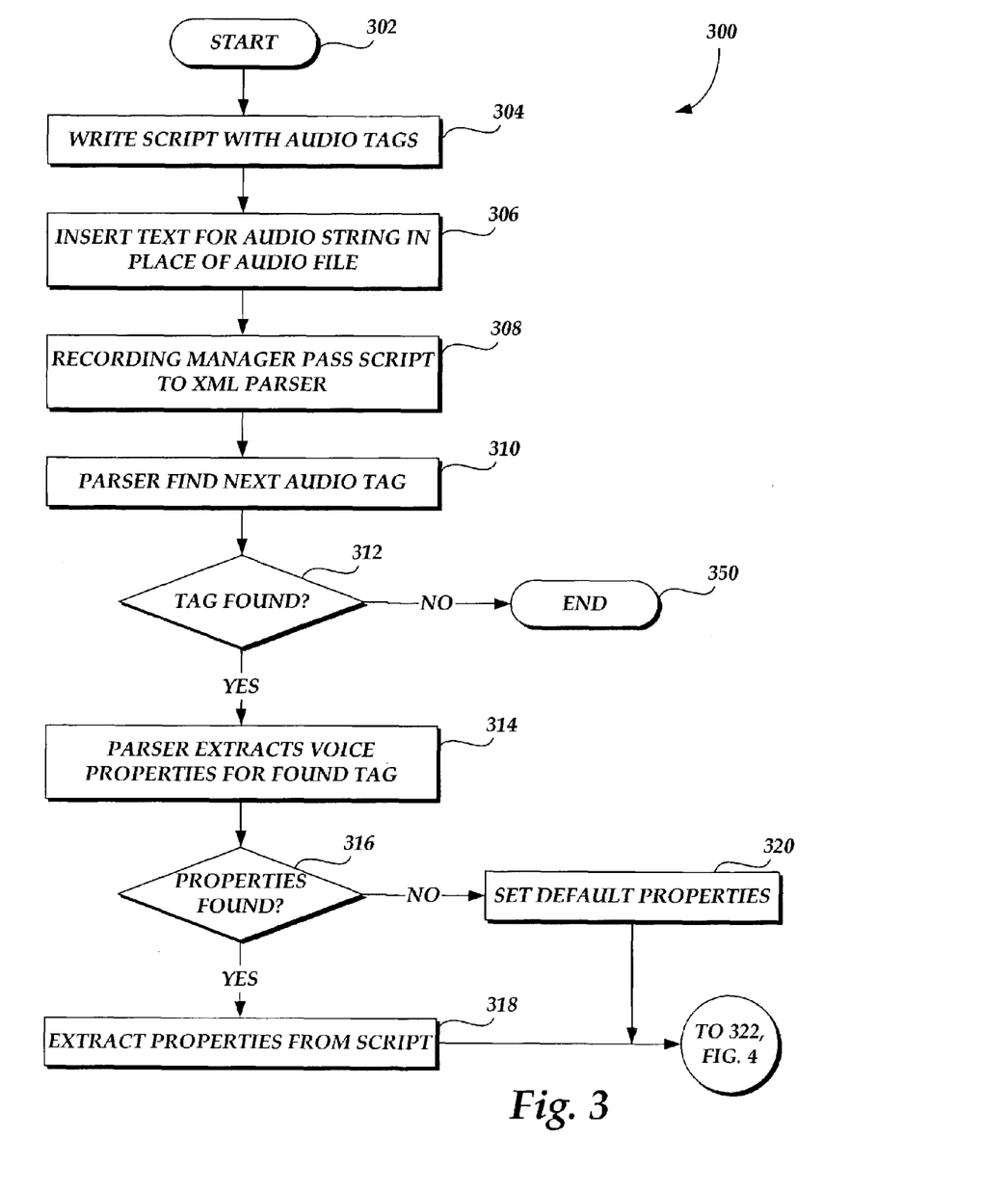
FIGS. 3, 4, and 5 are flow diagrams illustrating a method for automating the assembly or creations of voice audio files for presentation to listeners or for use in voice interactive services.

At step 306, the developer inserts into an audio tag the required text "welcome to your telecommunications services provider—for services in English, press 1 or say English" into the VoiceXML script instead of a specified audio file name. The developer utilizes her VoiceXML text editor 110 or graphical user interface editor for preparation of the VoiceXML script. At step 308, the recording manager software application 130 passes the VoiceXML script to the XML parser 120. At step 310, the XML parser 120 parses the received VoiceXML script to locate any audio tags contained therein.

At step 312, a determination is made as to whether any audio tags are located in the VoiceXML script. If no audio tags are located in the VoiceXML script, the method ends at 350. If audio tags are located by the XML parser 120 in the VoiceXML script, the method proceeds to step 314, and the parser 120 extracts the voice properties, if any, associated with the audio tag. For example, if a voice property such as "male adult" is specified for the located audio tag, as described above with reference to FIG. 1, the XML parser locates the property and extracts the property from the script at step 318. If no voice properties are found by the parser 120 for the first located audio tag, the method proceeds to step 320, and default voice properties such as female adult may be set by the recording manager 130 for the associated audio tag.

Figure 4:
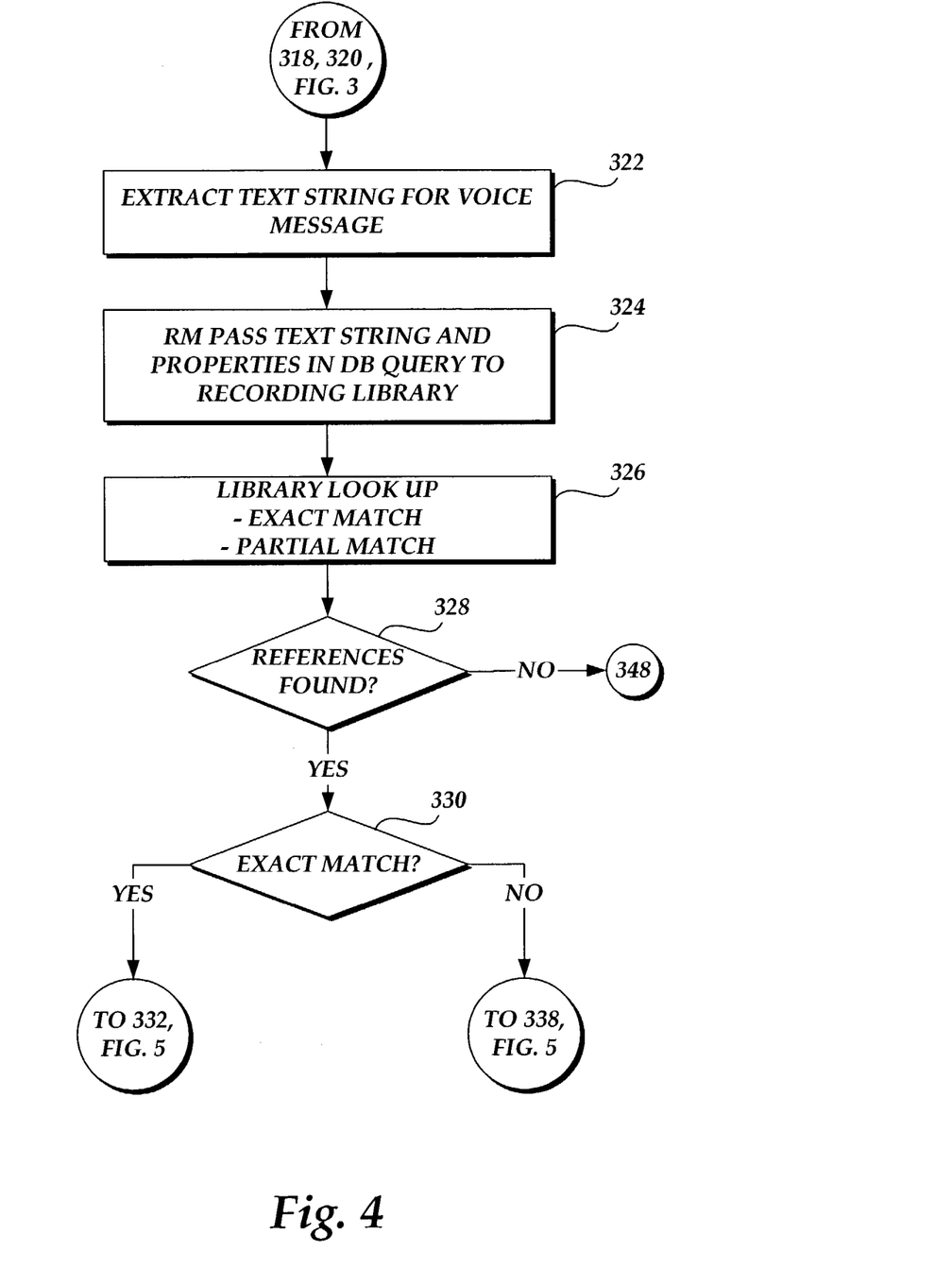

Referring now to FIG. 4, at step 322, the parser 120 extracts the text associate with the located audio tag, for example "welcome to your telecommunications services provider—for services in English, press 1 or say English." The extracted text strings and extracted voice properties, if any, are passed by the parser 120 to the recording manager 130. At step 324, the recording manager 130 passes the extracted text string and voice properties including default voice properties, if required, in a database query to the recording library 140. At step 326, a database lookup is performed to determine whether an exact matching audio file with matching voice properties is located in the recording library 140. Additionally, at step 326, a lookup is performed to determine whether partially matching audio files are located in the recording library 140. As should be understood, when the recording manager 130 passes the text string and voice properties to the recording library 140, the recording manager 130 may pass a number of database queries made up of various combinations of the extracted text and proprieties. For example, the recording manager 130 may first pass the extracted text string and associated voice properties.

The recording manager may pass individual database queries containing each word in the extracted text string such as "welcome", "to", "your," "telecommunications," "service," and so on to locate individual pre-recorded audio files for each individual word of the extracted text string. As should be understood, a number of combinations of individual words may also be passed to the recording library, such as "telecommunications services provider," where there is a high probability that a previously recorded audio file exists for the combined words. Likewise, various combinations of words and voice properties may also be passed by the recording manger 130 to the recording library 140. At step 328, a determination is made as to whether any matching audio file references are located in the recording library 140. If no references are found, the methods proceed to step 348 and manual process for creating a required audio file is followed, as described below.

If audio file references are found in the recording library 140, the method proceeds to step 330 and a determination is made as to whether an exact match for the desired text and voice properties is located. If so, the method proceeds to step 332, FIG. 5, and a determination is made as to whether the audio file located in the recording library 140 should be automatically accepted. That is, the voice application developer may decide to automatically accept, without review, any audio file located by the recording manger 130 in the recording library 140 matching the desired text and voice properties. If the developer has designated automatic acceptance, the method proceeds to step 346 and the recording manager 130 populates the VoiceXML script audio tag with the audio file name located in the recording library 140. Accordingly, when the VoiceXML script is subsequently executed, the designated audio file is played.

Figure 5:
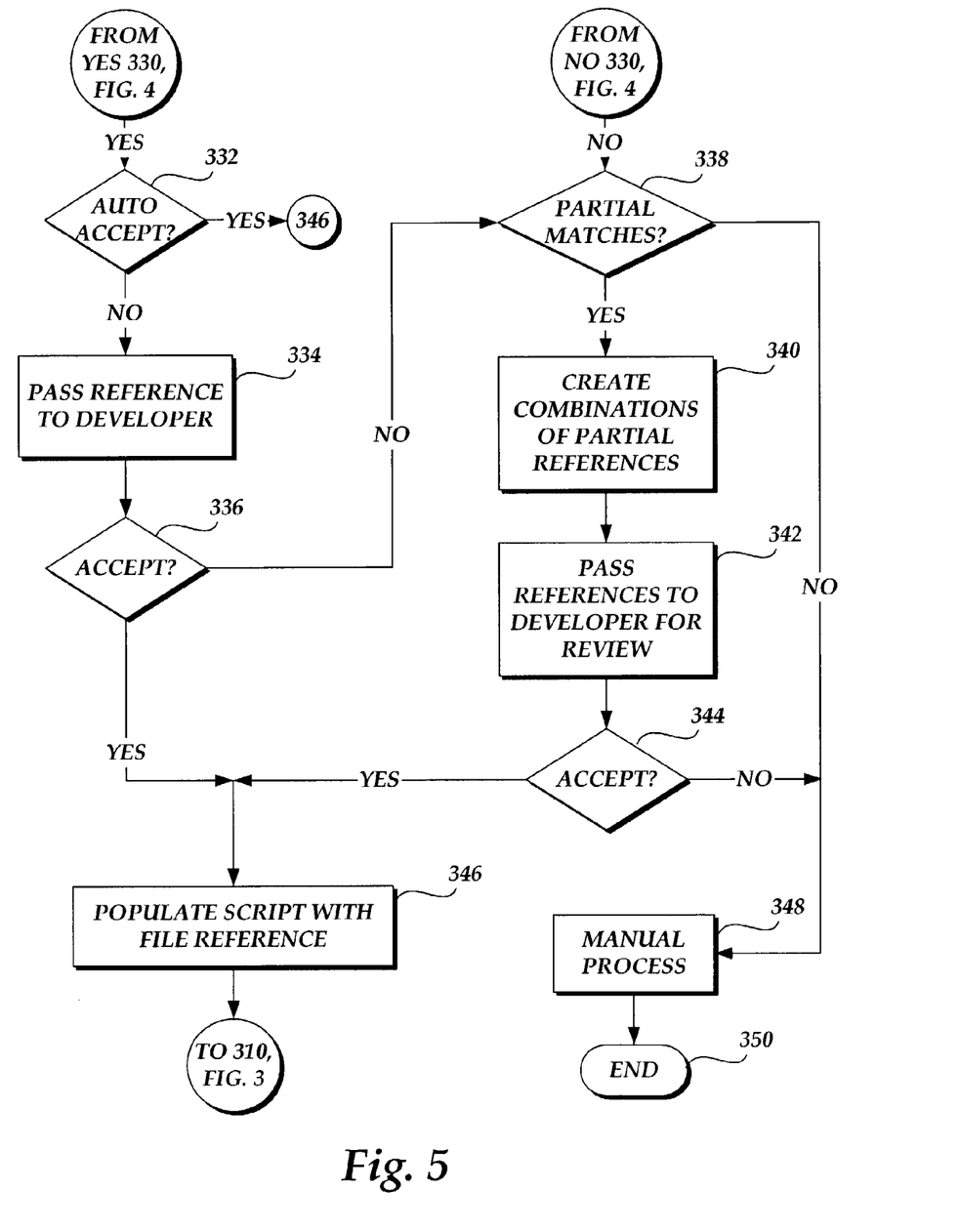

Referring to step 332 if the developer has not designated automatic acceptance of matching audio files, the method proceeds to step 334 and the located matching audio file is passed to the developer for review. As should be understood, the developer may play the located audio file via a speaker associated with the developer's computer 204 to determine whether the located audio file meets the developer's requirements. If the developer is satisfied with the located audio file, the method proceeds to step 336 and the developer may accept the located audio file. If so, the method proceeds to step 346 and the audio file name is populated into the VoiceXML script, as described above. If the developer is not satisfied with the located matching audio file, the method proceeds to step 338 for a determination as to whether partially matching references may be combined to provide the developer with an audio file that is more satisfactory to the developer. For example, a matching audio file may have been located as described above having the desired text and the desired voice properties, but upon reviewing the located audio file, the developer may not be satisfied with the voice talent utilized for creation of the previously recorded file.

That is, the developer may desire a more youthful voice, or the developer may determine that a voice of a different gender may be more satisfactory for the desired implementation.

Referring back to step 330, if no audio files matching the exact text string and required voice properties are located, or if such a file is located but, the developer rejects the located file, then the method proceeds to step 338, FIG. 5, and a determination is made as to whether partially matching audio files are located in the recording library 140. That is, a determination is made as to whether audio files matching segments of the text string and associated voice properties are found. For example, an audio file having the desired voice properties may be found which when executed plays "welcome to your telecommunications services provider," and a second audio file may be located having the desired voice properties such as "male adult," which when executed plays the phrase "for services in English, press 1 or say English."If no partially matching audio files are located, the method proceeds to step 348 and a manual development process may be utilized, as described below. If partially matching audio files, are located in the recording library 140, the method proceeds to step 340 and a combination of the references is prepared for presentation to the developer.

At step 342, a combination of audio file references is presented to the developer for review. The developer may then listen to the combination of audio file references, and the method proceeds to step 344 where the developer may accept or reject the combination of audio file references. If the developer reviews the combination of audio file references and determines that the combination will create a satisfactory audio file, the method proceeds to step 346. At step 346, the recording manger 130 populates the VoiceXML script with an audio file name which when executed will play the combined references. For example, the XML script may be populated with the audio file name comprised of a first audio file plus a second audio file so that when the resulting VoiceXML script is executed, audio file 1 will be played followed by audio file 2 to provide the listener or caller with the desired audio announcement.

As described above, once an audio file or a combination of audio files is found to be acceptable, the associated VoiceXML script is populated with audio file names for subsequent play when the script is executed. Examples of how VoiceXML script may be structured according to the present invention are as follows. If a developer desires a file which when played provides an audio-formatted statement "hello world," three different VoiceXML script statements may be structured as follows.

```
1.    <assign name = "myclip" expr = "hello.wav + world.wav"/>
      <audio expr = "myclip">hello world</audio>
2.    <audio src = "hello.wav">hello</audio>
      <audio src = "world.wav">world</audio>
3.    <audio src = "hello_world.wav">hello world</audio>
```

All three example script statements play "hello world" when executed. Script statements 1 and 2 play two files, namely "hello.wav" and "world.wav." Script statement 3 plays a single file, namely "hello world.wav." File 1 includes a reference pointing to the concatenation of two files, namely "hello.wav" and "world.wav." File 3 will be replaced by file 1 if the recording library 140 does not have a single file providing "hello world," but that includes two files providing "hello" and "world."

Referring back to step 344, if the developer does not find the combination of located audio file references acceptable or otherwise satisfactory, the method proceeds to step 348, and a manual development process may be performed by the developer. That is, the developer may decide that a voice talent such as a male adult speaker must be obtained who will record a new audio file that is satisfactory to the developer. Or, the developer may determine that the voice talent is required only to record a new audio file segment for combining with previously recorded audio file segments located in the recording library 140. Once the manual process is completed, an audio file name associated with the manually created audio file is populated into the VoiceXML script, as described above with reference to step 346. Referring back to step 346, after an audio file name associated with a single audio file, a combination of audio files, or a newly created audio file is populated into the VoiceXML script, the method proceeds back to step 310, and the XML parser may locate the next audio tag in the VoiceXML script prepared by the developer. The method then proceeds, as described above, for locating an acceptable audio file for association with the next located audio tag. The method ends at 350.

As described herein, methods and systems for automating assembly or creation of voice audio files for presentations to listeners or for use in a voice interactive services are provided. Advantageously, a VoiceXML script developer may populate a script with audio file names located in a repository of previously recorded audio files without the need for manually locating potentially satisfactory audio files one file at a time. Only if the automated system is unable to locate satisfactory previously recorded audio files for use by the developer does the developer utilize a manual process for creating or otherwise obtaining a satisfactory audio file or a combination of audio files. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of automating the preparation of a voice application, comprising:

writing a voice software application for providing an audio announcement;

applying markup language elements to the application;

annotating the application with markup language audio tags;

associating via a processor segments of a text string to be spoken in the voice application with a plurality of audio tags, the plurality of audio tags include matching voice properties for audio files corresponding to each segment of the text string, and the voice properties define an attribute of the audio files that including a gender of a speaker and an age group of the speaker;

parsing the application to locate the plurality of audio tags;

passing the segments of the text string associated with the plurality of audio tags to a database of audio files;

if an audio file having content and voice properties matching all segments of the text string is located in the database of audio files, replacing the segments of the text string and the associated audio tag with a file name of the located audio file automatically; and if an audio file having content and voice properties matching a portion of the segments of the text string is located in the database of audio files, passing the located audio file to an audio file developer for review and replacing the segments of the text string and the associated audio tag with a file name of the located audio file upon file developer confirmation.

2. A method of claim 1 wherein annotating the application with markup language audio tags include annotating the application with voice Extensible Markup Language (VoiceXML) audio tags.

3. The method of claim 1 wherein associating the segments of the text string with the plurality of audio tags includes inserting each segment of the text string within a corresponding audio tag.

4. The method of claim 1 further comprising: replacing the segments of the text string with corresponding audio files only if the corresponding audio file is located for each segment of the text string in the database of audio files.

5. The method of claim 4, wherein passing the segments of the text string to a database of audio files includes passing the segments of the text string and the corresponding voice properties to the database of audio files.

6. The method of claim 5, wherein replacing the segments of the text string with a file name of the located audio file includes replacing segments of the text string with a file name of the located audio file if the audio file has content matching the particular segment of the text string and matching the corresponding voice property.

7. The method of claim 6, further comprising prior to parsing the application to locate the plurality of audio tags, passing the application to an application parser for locating the plurality of audio tags and for locating the text string.

8. The method of claim 7, wherein the application parser includes a voice XML parsing application.

9. The method of claim 8, wherein parsing the application to locate the plurality of audio tags includes extracting the segments of the text string associated with a portion of the plurality of audio tags from the application.

10. The method of claim 9 further comprising extracting a voice property associated with the plurality of audio tags from the application.

11. The method of claim 10, wherein if no voice property is associated with an audio tag, selecting a default voice property.

12. The method of claim 7, wherein passing the application to an application parser includes passing the application to a recording manager application for locating the desired audio file content.

13. The method of claim 5, wherein passing the segments of the text string and the voice properties to the database of audio files includes passing the segments of the text string and the voice properties to the database of audio files via a database query.

14. The method of claim 13 whereby the database of audio files includes a recording library having a plurality of pre-recorded audio files.

15. The method of claim 5, further comprising after passing the segments of the text string and the voice properties to the database of audio files, searching the database of audio files for one or more audio files having content matching the voice properties and matching all or part of the segments of the text string.

16. The method of claim 1, wherein if one of the one or more audio files is acceptable, replacing the segment of the text string with a file name of the acceptable one of the one or more audio files.

17. The method of claim 1, wherein if a combination of the one or more audio files is acceptable, replacing the text string with a file name representing the combination of the one or more audio files.

18. The method of claim 16, further comprising prior to replacing the text string with a file name of the acceptable one of the one or more audio files, passing the one or more audio files to an audio file developer for review.

19. The method of claim 1, wherein writing a voice software application includes writing the voice software application using a text editor.

20. The method of claim 1, wherein writing a voice software application includes writing the voice software application using a graphical user interface-based software application editor.

21. A system for automating the preparation of a voice application, comprising:
a processor;
an XML parser operative to control the processor to:
parse a voice software application to locate a plurality of audio tags;
pass a plurality of text strings to be spoken in the voice application associated with the corresponding plurality of audio tags to a recording manager application;
the recording manager application operative to control the processor to:
pass the plurality of text strings associated with the corresponding plurality of audio tags to a database of audio files, wherein each audio tag includes at least one voice property;
determine if an audio file having content matching one of the plurality of text strings is located in the database of audio files, wherein the voice property of a matching text string defines an attribute of the corresponding audio file that includes at least one of a gender of a speaker and an age group of the speaker; and
replace the text string with a file name of the corresponding audio file located in the database of audio files automatically, if the content and associated voice properties of the located audio file match the text string and its voice property; and
replace the text string with a file name of a corresponding audio file located in the database of audio files after passing the located file to a developer for review and obtaining developer confirmation, if the content and associated voice properties of the located audio file partially match the text string and its voice property.

22. The system of claim 21, wherein the recording manager application is further operative to control the processor to determine whether one or more audio files are located in the database of audio files that partially match one of the plurality of text strings, if an audio file having content matching one of the plurality of text strings, if an audio file having content matching one of the plurality of text strings is not located in the database of audio files.

23. The system of claim 22, wherein the recording manager application is further operative to control the processor to replace the text string with a file name representing a combination of one or more corresponding audio files, if a combination of the one or more audio files is located in the database of audio files having content matching the text string.

24. The system of claim 21, further comprising a text editor operative to control the processor to write a voice software application.

25. A method of automating the preparation of a voice application, comprising:
annotating a voice Extensible Markup Language (XML) application with one or more audio tags, wherein each audio tag includes at least one voice property;

associating a text string to be spoken in the voice application with a corresponding audio tag;

parsing via a processor the application to locate the corresponding audio tag;

passing the text string and the corresponding audio tag to a database of audio files; and if an audio file having content matching the text string and at least one voice property included in the associated audio tag is located in the database of audio files, replacing the text string with a file name of the located audio file automatically; and if an audio file having content matching the text string and the at least one voice property is not located in the database of audio files, determining whether a plurality of audio files are located in the database of audio files that match the at least one voice property and that partially match the text string, and replacing the text string with a file name representing the combination of the plurality of audio files after passing the file name representing the combination of the audio files to a developer for review and receiving developer confirmation.

26. The method of claim 25, wherein replacing the text string with a file name of the located audio file includes replacing the text string with a file name of the located audio file that has content matching the text string and a default voice property.

27. The method of claim 26, further comprising after passing the text string and the at least one voice property to the database of audio files, searching the database of audio files for one or more audio files having content matching the at least one voice property and matching at least a portion of the text string.

* * * * *